E. B. Sturdevant,
Picture Exhibitor.
Nº 65,116.   Patented June 4, 1867.
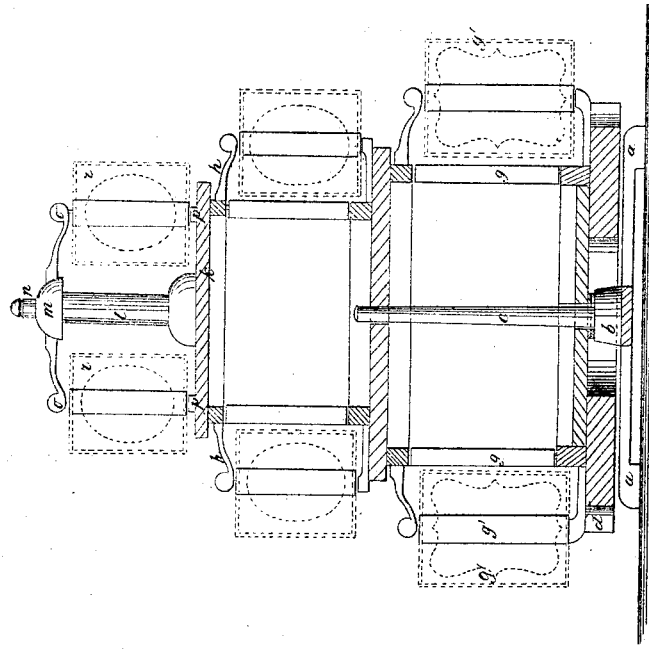
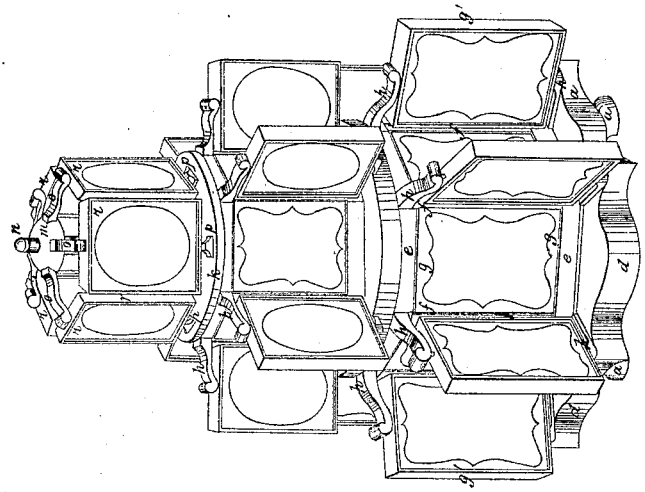
Witnesses.
A. L. Peck.
G. M. Peck.
Inventor.
E. B. Sturdevant
By his atty.
H. P. K. Peck.

United States Patent Office.

EDWIN B. STURDEVANT, OF GERMANTOWN, OHIO.

*Letters Patent No. 65,446, dated June 4, 1867.*

REVOLVING STAND FOR PICTURES.

The Schedule referred to in these Letters Patent and making part of the same

TO ALL WHOM IT MAY CONCERN:

Be it known that I, EDWIN B. STURDEVANT, of Germantown, in Montgomery county, in the State of Ohio, have invented a new and useful Revolving Stand for Pictures, which I denominate a "Revolving Photograph Castle;" and I do hereby declare that the following is a full and exact description thereof, reference being had to the accompanying drawings, and to the letters of reference marked thereon.

Figure 1 is a representation of my invention.

Figure 2 is a vertical section of the same.

In the drawings $a\ b\ c$ denote the pedestal and spindle upon which three chambers and series of picture frames are supported, and upon which the entire superstructure will freely revolve. The lower chamber is constructed with an annular disk or base, scalloped round its periphery, as seen at $d$, and upon this base $d$ are eight openings surrounded by framework $e\ e\ f\ f$, in which there are eight double frames $g\ g$, which are pivoted centrally at their tops and bottoms, so as to freely revolve to exhibit pictures on either side. The picture-frames $g$ are constructed with two double fronts also, to accommodate two pictures, and one of sufficient capacity to serve as a receptacle for four or five common photographic pictures. The pictures may be inserted by removing the cap-rail, which is let in and held in place by a suitable rabbet formed thereon, and these are also pivoted centrally between the brackets $h\ h$ which project from the top and bottom of the chamber. The lower chamber with its two series of brackets will receive sixteen picture-frames, and, being double, will exhibit thirty-two pictures. The second chamber is constructed substantially like the lower chamber, and is provided with twelve revolving frames, in which twenty-four pictures may be shown at the same time. Surmounting the second chamber there is a disk, $k$, from the centre of which a shaft, $l$, projects, which is provided with a dome, $m$, and spire $n$. Radiating from the dome $m$ are six brackets or arms $o$, and upon the disk $k$ there are six angular pedestals $p$ and the series of upper frames $r\ r$, which are constructed like the other frames supported by brackets, are pivoted centrally between the brackets $o$ and pedestals $p$. In fig. 2 the frames in brackets are represented in red and black lines at right angles to each other, to show their capability of revolving upon their pivots, and of presenting the pictures at any desired angle to the view.

It will be observed that the structure is capable of being revolved upon the pedestal and spindle $a\ b\ c$, and and all of the frames, which are double and pivoted, will freely turn upon their pivots to present either side to the view. The chambers, with their frames, may be secured together in any suitable manner, and the number and size of them may be increased, as may be desired, to present a castle-like structure.

Having now fully described my improvements in revolving "photograph castles," what I claim therein, and desire to secure by Letters Patent, is—

1. The rotary frames $g'\ g'$ pivoted in the manner described, when arranged upon revolving chambers, substantially as and for the purpose specified.

2. The series of revolving chambers furnished with brackets $h\ h$, and arranged to exhibit two or more tiers of rotary double picture-frames, substantially as and for the purpose specified.

In testimony whereof I have hereunto set my hand this 4th day of October, 1866.

EDWIN B. STURDEVANT.

Witnesses:
H. P. K. PECK,
GEO. H. HENKEL.